US011976508B2

(12) United States Patent
Egger et al.

(10) Patent No.: US 11,976,508 B2

(45) Date of Patent: May 7, 2024

(54) SLIDING DOOR SYSTEM, SLIDING DOOR AND BUFFER DEVICE

(71) Applicant: HAWA SLIDING SOLUTIONS AG, Mettmenstetten (CH)

(72) Inventors: Ralph Egger, Hauptwil (CH); Marek Lach, Obfelden (CH)

(73) Assignee: HAWA SLIDING SOLUTIONS AG, Mettmenstetten (CH)

( * ) Notice: Subject to any disclaimer, the term of this patent is extended or adjusted under 35 U.S.C. 154(b) by 44 days.

(21) Appl. No.: 17/903,463

(22) Filed: Sep. 6, 2022

(65) Prior Publication Data

US 2023/0071029 A1 Mar. 9, 2023

(30) Foreign Application Priority Data

Sep. 7, 2021 (EP) .................................... 21195398

(51) Int. Cl.

*E05D 15/00* (2006.01)
*E05D 15/06* (2006.01)
*E05F 5/00* (2017.01)

(52) U.S. Cl.

CPC .......... *E05F 5/003* (2013.01); *E05D 15/0621* (2013.01); *E05Y 2900/132* (2013.01)

(58) Field of Classification Search

CPC ... E05F 5/00; E05F 5/003; E05F 5/027; E05F 5/06; E05F 5/08; E05F 5/10; E05D 1/00;

(Continued)

(56) References Cited

U.S. PATENT DOCUMENTS

| | | | | |
|---|---|---|---|---|
| 5,906,026 A * | 5/1999 | Junttila | .................. | E05F 3/221 16/85 |
| 6,438,795 B1 * | 8/2002 | Haab | ...................... | E05F 5/003 16/86 B |

(Continued)

FOREIGN PATENT DOCUMENTS

| | | | | |
|---|---|---|---|---|
| DE | 102012222200 A1 * | 6/2014 | .............. | E05F 5/003 |
| DE | 102017117573 B4 * | 2/2021 | ........... | E06B 3/4636 |

(Continued)

OTHER PUBLICATIONS

Feb. 7, 2022 Search Report issued in European Patent Application No. 21195398.9.

*Primary Examiner* — Chuck Y Mah

(74) *Attorney, Agent, or Firm* — Oliff PLC

(57) ABSTRACT

The sliding door system includes a sliding door, displaceable along a running rail relative to a stationary activation member up to a closing position; which includes a door leaf equipped with an activatable sealing device including an extractable sealing strip and actuating element equipped with a transmission device including a transmission element; and includes at least two carriages, including a carriage body and running elements connected to the door leaf, and are held in the running rail displaceable in parallel to the longitudinal axis of the running rail; wherein the activation member and transmission device are arranged so that, when the sliding door enters the closing position, a force can be transmitted from the activation member via the transmission element to the actuating element in order to drive out the sealing strip. A stationary buffer device stops the sliding door in the closing position and includes the activation member.

15 Claims, 9 Drawing Sheets

(58) Field of Classification Search
CPC ....... E05D 1/06; E05D 1/0621; E05D 1/0626; E05D 1/0639; E05Y 2900/132
See application file for complete search history.

(56) References Cited

U.S. PATENT DOCUMENTS

| | | | | |
|---|---|---|---|---|
| 7,891,052 | B2 | 2/2011 | Haab et al. | |
| 8,402,606 | B1 * | 3/2013 | Tsai | E05F 5/003 16/49 |
| 9,290,977 | B2 | 3/2016 | Haab et al. | |
| 9,341,011 | B2 | 5/2016 | Haab et al. | |
| 2002/0178668 | A1 * | 12/2002 | Haab | E05D 13/04 52/243.1 |
| 2011/0126471 | A1 | 6/2011 | Hans | |
| 2016/0138311 | A1 * | 5/2016 | Kreyenborg | E05D 15/063 49/506 |
| 2019/0128054 | A1 | 5/2019 | Dintheer | |
| 2021/0017800 | A1 * | 1/2021 | Terno | E05D 15/18 |
| 2021/0324668 | A1 * | 10/2021 | Stratico | E05C 17/60 |

FOREIGN PATENT DOCUMENTS

| | | | | |
|---|---|---|---|---|
| EP | 0 818 598 | A1 | 1/1998 | |
| EP | 2305938 | A1 * | 4/2011 | E06B 3/4636 |
| EP | 2 899 350 | A1 | 7/2015 | |
| EP | 2937502 | A1 * | 10/2015 | E05F 5/003 |
| EP | 3 816 383 | A1 | 5/2021 | |
| EP | 3 825 503 | A1 | 5/2021 | |

* cited by examiner

SLIDING DOOR SYSTEM, SLIDING DOOR AND BUFFER DEVICE

BACKGROUND

The invention relates to a sliding door system with a sliding door comprising at least one activatable sealing device for closing a door opening, and a buffer device for the sliding door system.

U.S. Pat. No. 7,891,052B2 discloses a sliding door system with carriages guided along a running rail, which serve to hold a glass panel. The carriages are connected to the glass panel by fastening means in such a way that the upper edge of the glass panel can be accommodated in the cross-section of the running rail. This allows the space between the glass panel and the running rail to be closed off almost tightly. In the case of sliding doors with a thicker separating panel, for example made of wood, the inclusion of the wooden panel in the cross-section of the running rail is hardly feasible.

U.S. Pat. No. 9,290,977B2 discloses a sliding door system with carriages that are connected to a door panel and can be moved along rails in such a way that the door panel can be guided against a door frame in front of a door opening. For this sliding door system, correspondingly designed rails are required.

US2011126471A1 discloses an activatable sealing device for a door or a window with a sealing rail and a sealing strip held therein, which can be lowered by means of a lowering mechanism. The lowering mechanism comprises an actuating element which acts on leaf springs connected to the sealing strip via interconnected slides. By pressing on the actuating element, the slides are actuated and the leaf springs are deformed, causing the sealing strip to be lowered. During this process, not only is the sealing strip moved downwards, but also carrier profile parts are moved towards a corresponding front face, thus effecting sealing also against the face. The actuating element protrudes from the sealing device and is pushed against the sealing device by the door frame when the door is closed. A second actuating button can be provided on the opposite end face of the door so that the lowering mechanism can be actuated from both sides of the door.

US2019128054A1 discloses a sliding door with an activatable lowering seal comprising an actuating element. The actuating element is operable by means of a transmission device screwed to the sliding door and an activation unit screwed to the door frame. The transmission device comprises a follower that can cooperate with the activation unit and a pivot arm connected to the follower that can cooperate with the activation unit when the sliding door is moved to the end position. In this operation, the follower is guided over a contact surface of the activation unit and rotated together with the pivot arm, which pushes the actuating element against the lowering seal. This device ensures the correct positioning and assembly of the activation unit.

It should be noted that the sliding doors are usually equipped with mounting devices that are connected to an associated carriage. The mounting devices are often integrated in a door recess, which means that the sealing technology and the running technology are located next to each other, which can result in conflicts during installation, maintenance and/or adjustment.

EP0818598B1 and U.S. Pat. No. 9,341,011B2 disclose mounting devices with mounting rails which are inserted into a recess on the upper side of the door leaf of a sliding door. In each mounting rail, a mounting unit is axially slidable and lockable. The mounting unit is connected by a connecting screw to the carriage body of a carriage, which is guided in a running rail.

In the device of EP0818598B1, the mounting unit for height adjustment of the sliding door is released and extracted from the mounting rail until the connecting screw in front of the end face of the door leaf can be gripped and turned by means of a tool.

In the device of U.S. Pat. No. 9,341,011B2, the mounting unit comprises an adjustment screw aligned parallel to the longitudinal axis of the running rail, by means of which a slide holder in which a slide is slidably mounted along guideways can be axially displaced. When the slide holder is moved axially, the slide connected to the adjustment screw is moved upwards or downwards along the guideways. By turning the adjustment screw, the sliding door can therefore be raised or lowered. For this adjustment it is not necessary to remove the mounting unit from the mounting rail. However, access to the adjustment screw must be guaranteed.

EP0818598A1 further discloses a buffer device comprising a damping element and a locking element. The buffer device elastically stops the sliding door at an end stop and then holds it. The buffer device can be positioned precisely so that the sliding door is stopped at the closing position, i.e., exactly in front of the door opening to be closed.

SUMMARY

Sliding door systems therefore often comprise several devices that allow to adjust the running path as well as the mounting height of the sliding door. It is possible that additional drive devices are provided by means of which the sliding door can be moved automatically. Due to the additional installation of an activatable sealing device, additional requirements for the adjustment of the sliding door system have to be fulfilled in order to ensure that the sealing devices are activated exactly at the closing position. The individual adjustment devices or device parts of the running technology and the sealing technology must be coordinated with each other in this respect, which can cause considerable effort.

Furthermore, it must be ensured that there are no conflicts between the devices and device parts used which could hinder the assembly, maintenance and/or adjustment of the individual device parts of the sliding door system.

It is therefore an object of the present invention to provide an improved sliding door system comprising a sliding door which comprises an activatable sealing device, a sliding door for such a sliding door system and an improved buffer device for the sliding door system.

The sliding door system shall have a simple and compact design and shall be installable, maintainable and adjustable with little effort.

The parts of the sealing technology, such as the sealing device and elements for activating it, as well as the parts of the running technology, such as the carriages guided in a running rail, for example between buffer devices, and assembly devices for connecting the carriages to the sliding door, shall interact advantageously and shall be optimally adapted to each other.

The parts of the running technology and the parts of the sealing technology shall be able to be used and/or interact without conflict. In particular, the elements of the running technology and the sealing technology shall be able to be assembled, disassembled and adjusted advantageously.

Furthermore, the interaction of the fixture parts of the running technology and the fixture parts of the sealing technology shall be able to take place optimally practically without mutual adjustments and adaptations.

The sliding door shall be held as close as possible to the running rail, so that the activatable sealing device must seal an air gap as small as possible.

Furthermore, the sealing device shall be activatable. The activatable sealing device shall comprise a sealing strip that can be extracted upwards or downwards by any mechanism.

The parts of the sliding door device shall be compact, inexpensive to manufacture and easy to assemble.

This task is solved with a sliding door system according to claim 1, a sliding door according to claim 11 and a buffer device according to claim 12. Advantageous embodiments of the invention are specified in further claims.

The sliding door system comprises a sliding door;

- which sliding door is displaceable along a running rail relative to a stationarily arranged activation member up to a closing position;
- which sliding door comprises a door leaf;
- which sliding door comprises at least two carriages, which comprise a carriage body and running elements, which are connected to the door leaf, and which are held in the running rail displaceable in parallel to the longitudinal axis of the running rail;
- which sliding door is equipped with an activatable sealing device, which comprises an extractable sealing strip and an actuating element; and
- which sliding door is equipped with a transmission device comprising a transmission element;
- wherein the activation member and the transmission device are arranged in such a way that, when the sliding door enters the closing position, a force can be transmitted from the activation member via the transmission element to the actuating element in order to drive out the sealing strip.

According to the invention a stationary buffer device is provided, which is provided for stopping the sliding door in the closing position and which comprises the activation member.

Preferably, the buffer device is located within the cross-section of the running rail. The running rail is preferably arranged on the upper side of the sliding door, so that the door leaf is suspended on the carriages, which can be moved within the running rail. With the sliding door in the closing position, a door opening can preferably be closed tightly.

The mutual coordination of the running technology and the sealing technology is thus carried out with reference to the buffer device, which must be positioned correctly. On the other hand, the mutual positioning of the buffer device and the activation member is omitted, resulting in an overall reduction in the complexity of the sliding door system. In the event of a change to the sliding door device that requires a new adjustment, only the buffer device may need to be realigned.

The buffer device comprises a buffer body which holds or comprises at least one damping element or damper and/or a locking element. Preferably, the buffer device comprises at least one central damping element or a central damper. Alternatively, the buffer device may be provided with a lateral damping element or a lateral damper on each side. In a further preferred embodiment, the lateral damper and the central damper are provided in combination.

The damping elements, lateral damper and/or central damper, can be made of an elastic material such as rubber. The damping elements, lateral damper and/or central damper, can also be mechanical dampers, such as spring elements, pneumatic dampers, hydraulic dampers, oil dampers or magnetic dampers with magnetic elements.

The locking element of the buffer device preferably comprises at least one locking arm by means of which the carriage can be held. Preferably, the locking element is fork-shaped and has two locking arms oriented towards the facing carriage. When the carriage enters, it is preferably coupled to the buffer device, whereby at least one locking arm elastically covers and holds one of the running wheels and/or a part of the carriage body.

The carriages can be mounted mechanically or magnetically within the running rail. The running elements can be rollers, wheels, sliding elements or ferromagnetic or permanent magnetic elements.

The activation member can be detachably connected to the buffer body, as can the at least one damper or the locking element. In a preferred embodiment, the activation member is an integral part of the buffer body. The buffer body can advantageously be provided with the activation member. For example, the buffer body is manufactured in one casting, which eliminates the need to manufacture the buffer body and the activation member separately.

The buffer device is preferably tensionable within the running rail, so that it can be moved to a suitable position and fixed or tensioned.

The running rail comprises a head piece and at least one side piece on which a foot piece is provided. Preferably, the running rail comprises a C-profile or a U-profile with two side pieces which are connected to each other at one end by a head piece and which are connected at the other end by foot pieces which face each other. The foot piece or foot pieces comprise running surfaces on the upper side on which the running elements of the carriages are supported.

Preferably, the buffer device or buffer body comprises foot elements that are supported on the foot pieces of the running rail. In this embodiment, the buffer device is preferably provided with at least one threaded hole for a counter screw, which is screwed against the head piece of the running rail to press the buffer device or the buffer body against the foot pieces of the running rail and thereby securing it.

Between the foot elements of the buffer device there is preferably an activation channel in which the activation member is provided and which is suitable for partially receiving the transmission element. The transmission element, possibly a transmission lever, can therefore enter the activation channel and there cooperate with the activation member. With this design of the buffer device, the sliding door can be raised further against the running rail, as the part of the transmission element exposed above the sliding door can enter the buffer device and preferably also the cross-section of the running rail. By lifting the sliding door maximally against the running rail, the air gap between the upper edge of the sliding door and the lower edge of the running rail, which must be closed by the activatable sealing device, is reduced. It is therefore easier to use activatable sealing devices or otherwise optimised sealing devices.

In a preferred embodiment, the activation member is designed as a ramp that runs straight or along a curve, preferably inclined to the longitudinal axis of the running rail. However, the activation member can also comprise other geometric shapes that allow the transmission element to rotate.

In a preferred embodiment, the ramp runs along a curve whose steepness is selected in such a way that the rotational speed of the transmission element, which is designed as a transmission lever, is continuously reduced from a high value at a constant travel speed of the sliding door. I.e., when driving along the ramp, the transmission lever is first turned quickly in order to raise the sealing strip rapidly.

Shortly before or after contacting the running rail, where an elastic sealing element of the sealing strip is deformed, the rotation speed is reduced accordingly so that the sealing strip is pressed against the running rail in a controlled manner. The sections or gradients of the curve or the course of the ramp are preferably selected in such a way that a minimum load on the parts of the device used and an optimum seal result.

The transmission element of the transmission device is preferably a transmission lever comprising a first lever part provided for cooperation with the activation member and a second lever part provided for cooperation with the actuating element of the sealing device. The two lever parts may be differently shaped, dimensioned and oriented. Preferably, both lever parts are aligned parallel or inclined to each other. The first lever part is typically longer than the second lever part and protrudes, for example, from a door recess of the door leaf.

The sliding door can comprise a door leaf made of glass or wood or another material.

Preferably, the door leaf is provided with a mounting channel or recess on the upper side, which preferably runs from one end face to the other end face of the door leaf and is delimited on one side or both sides by remaining parts of the door leaf.

Preferably, a door recess is provided, a) in which a mounting device is arranged comprising a mounting unit which is connected to one of the carriages and which is detachably held in a mounting rail connected to the door leaf;

b) in which the activatable sealing device is arranged beside the mounting device; and c) in which in front of the mounting device and der activatable sealing device the transmission device is arranged.

Preferably, the transmission device comprises a lever holder which holds a lever shaft on which the transmission element, possibly the transmission lever, is rotatably mounted, and which lever holder is preferably detachably held by a mounting base which is connected to the door leaf. The lever holder and the mounting base therefore preferably comprise mutually corresponding retaining elements and mutually corresponding latching elements.

This embodiment of the transmission device comprises several advantages. To mount the transmission device, the mounting base can first be connected to the door leaf, for example by screwing it in place. Then the lever holder can be inserted.

Before inserting the lever holder, the mounting unit of the mounting device is inserted into the mounting rail, which has also been previously mounted inside the door recess or screwed in if appropriate. Preferably, a mounting bar is fixed inside the door recess, for example by means of self-tapping screws or wood screws. The mounting rail can subsequently be fixed by means of screws that are screwed into threaded bores of the mounting bar. This has the advantage that the mounting bar, which preferably comprises several mounting holes, can be mounted in a particularly stable manner. The mounting rail can then be connected to the mounting bar in a simple manner, for example with only two mounting screws.

The mounting unit is inserted into the mounting rail before the lever holder is connected to the pre-assembled mounting base. The lever holder can also be detachably connected to the mounting bar.

If the mounting unit has to be removed from the mounting rail, for example for maintenance or adjustment of the sliding door, the lever holder of the transmission device is first loosened and removed with a handgrip or the use of a tool. The mounting unit can now be pulled out of the mounting rail via the mounting base in front of the front side of the door leaf. Afterwards, the mounting unit can be pushed back into the mounting rail and the lever holder can be reconnected to the mounting base with a handgrip.

Since the mounting base is mounted without lever holder and transmission lever, an area of the mounting base that is below the lever holder after mounting the lever holder can be used for inserting mounting screws. This means that no mounting flanges are required outside the area of the lever holder, wherefore the lever holder can be reduced to the dimensions of the mounting base. The transmission device therefore occupies the smallest possible space. This allows the transmission device to be mounted close to the front of the door leaf in a stable manner, while preferably leaving space for a cover.

BRIEF DESCRIPTION OF THE DRAWINGS

The invention is explained in more detail below with reference to the drawings. Thereby shows.

Figure 1:
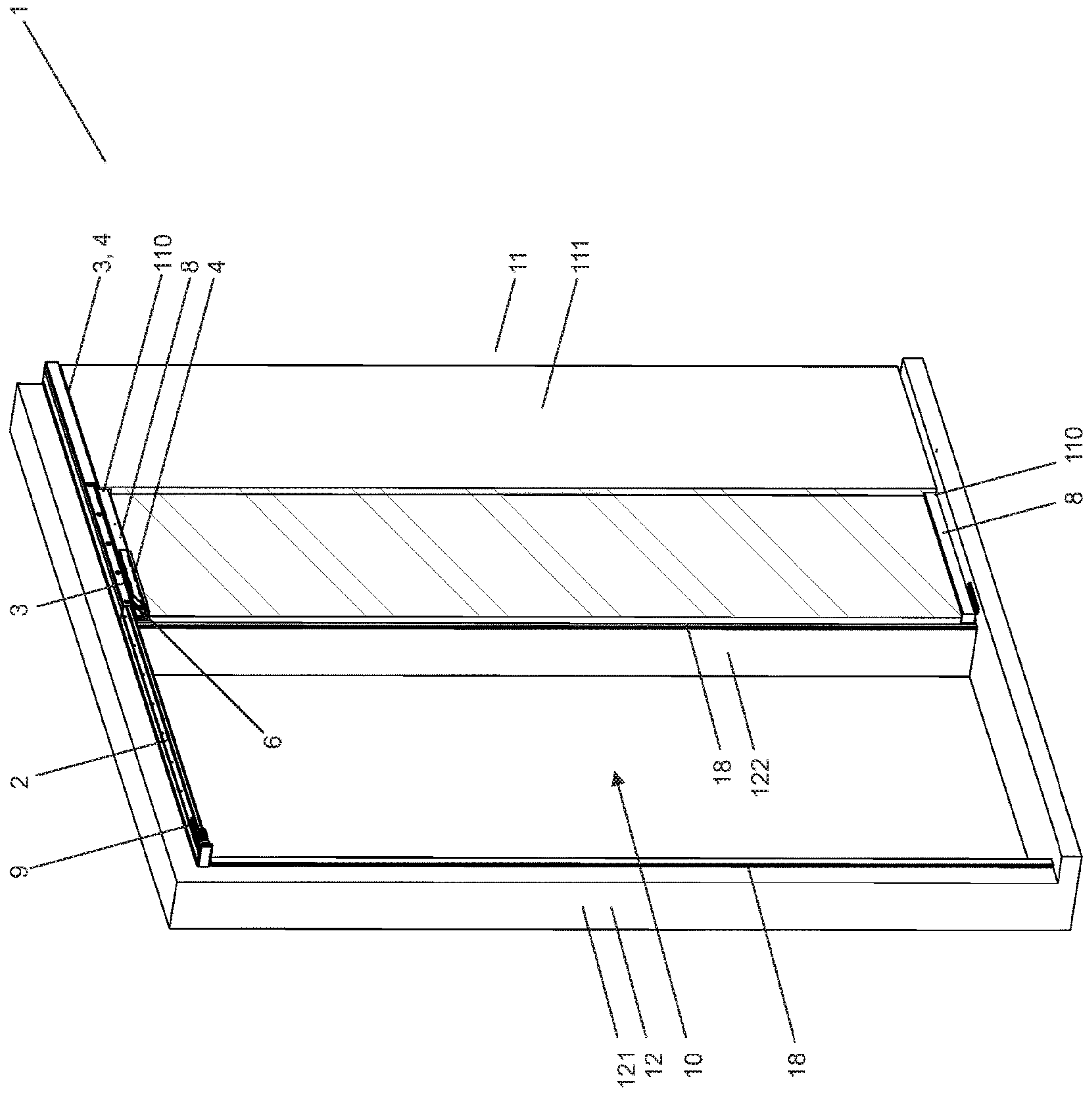
FIG. 1 an inventive sliding door system 1 with an inventive sliding door 11, by means of which a door opening 10 enclosed by a door frame 12 can tightly be closed by means of sealing devices 8, 18 and which sliding door 11 can be displaced by means of carriages 3 along a running rail 2 up to a buffer device 9, which catches and holds the sliding door 11 in a closing position in which the door opening 10 is closed and which sliding door 11 is provided with an activation member 911 (see FIG. 3), by means of which an activatable sealing device 8 can be actuated.
Figure 3:
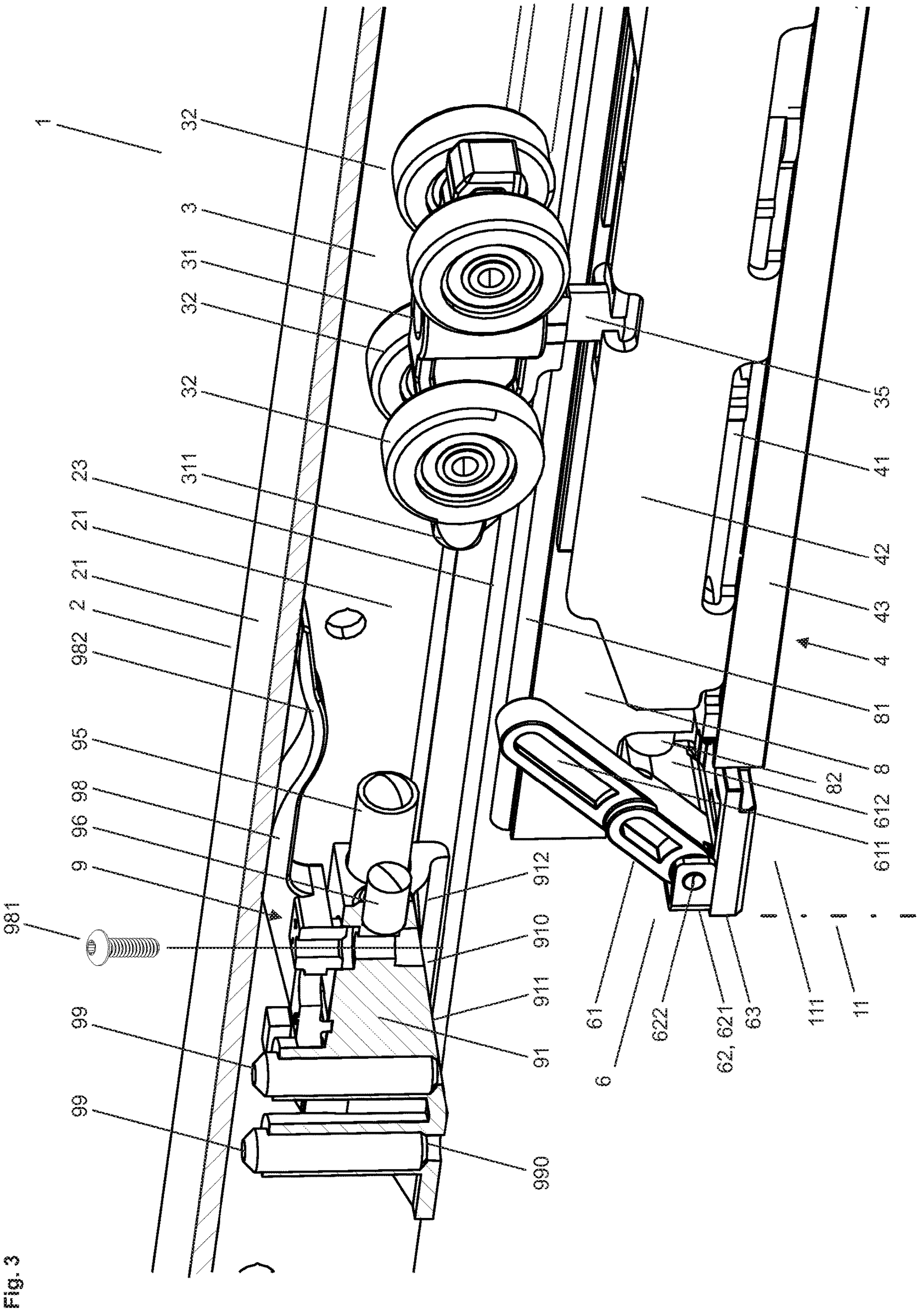
FIG. 3 the sliding door system 1 with the sliding door 11 of FIG. 1 in spatial representation with the schematically shown door leaf 111, the carriage 3 guided in the running rail 2 and facing the buffer device 9, the mounting device 4, the activatable sealing device 8 and the transmission device 6, which comprises a transmission lever 61 which is rotatably held by a lever shaft 622 and which can cooperate with a first lever part 611 with the buffer device 9 and with a second lever part 612 with an actuating element 82 of the activatable sealing device 8.
Figure 6B:
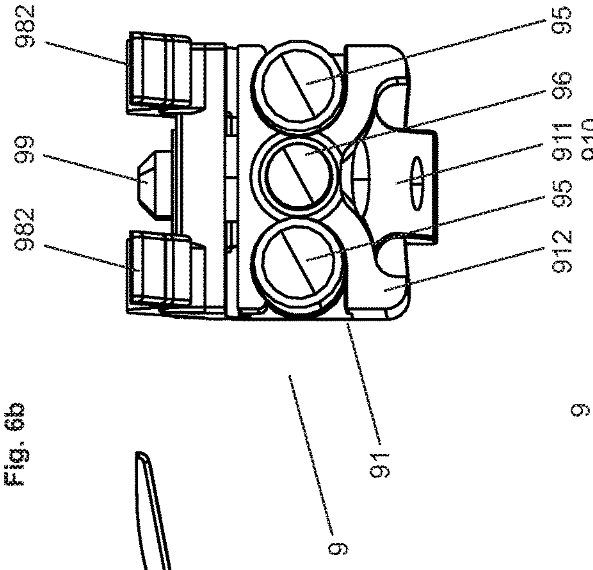
Figure 6A:
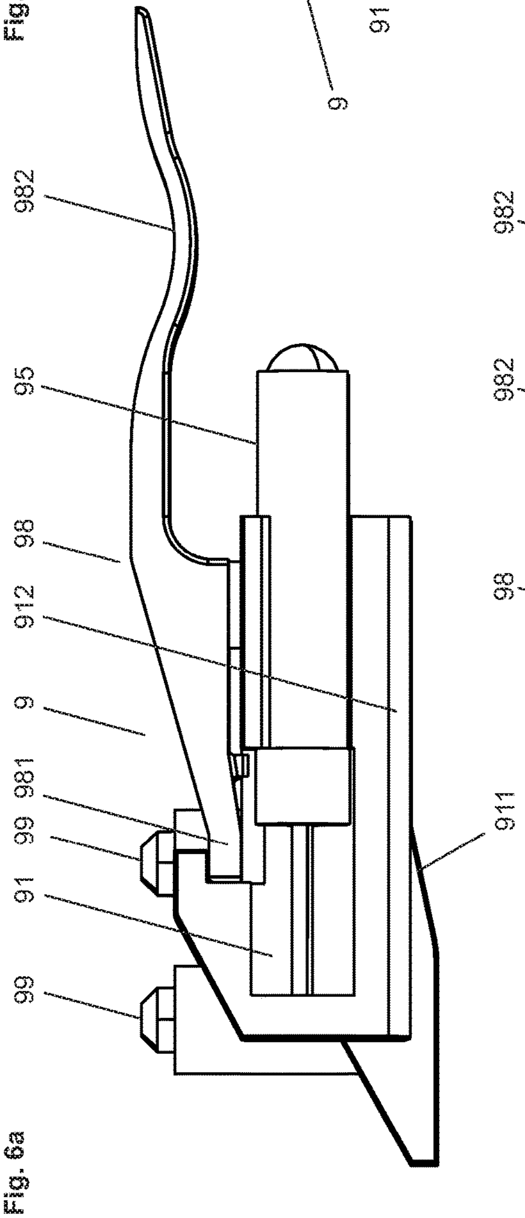
Figure 6C:
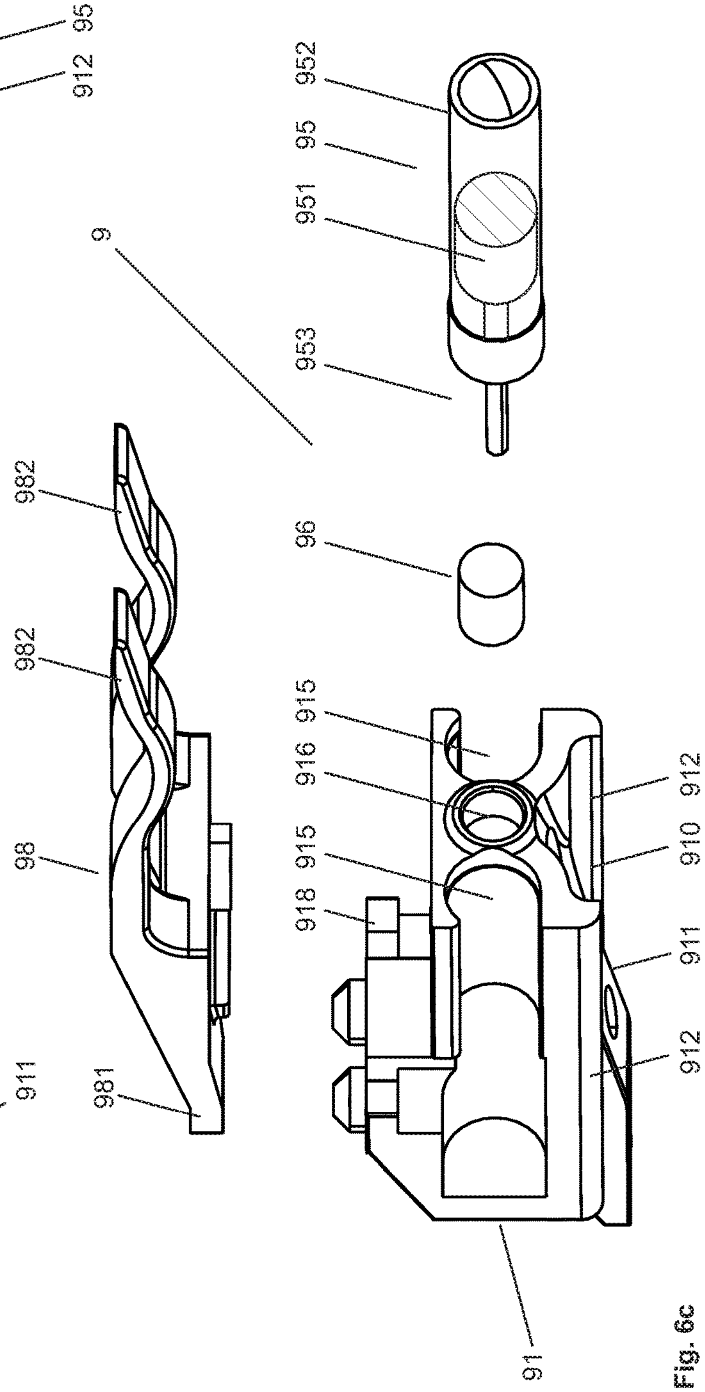
Figure 7A:
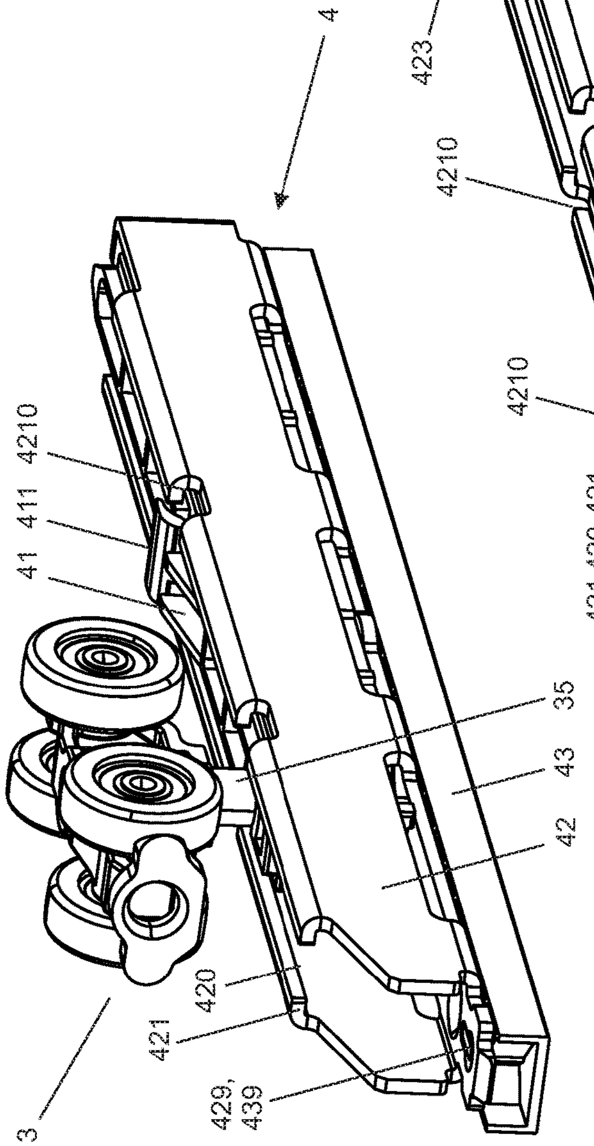
Figure 7B:
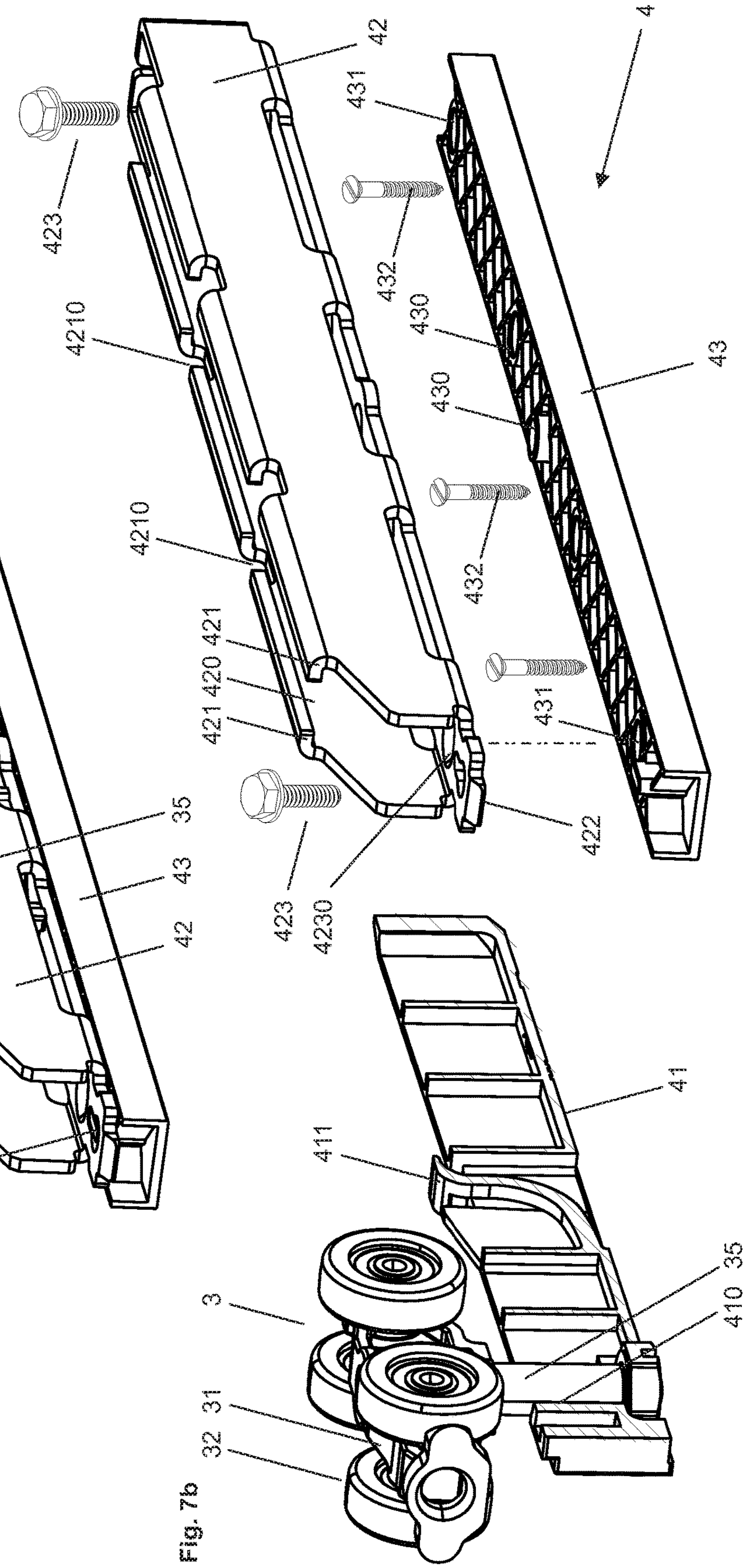
Figures 8A, 8B, 8C:
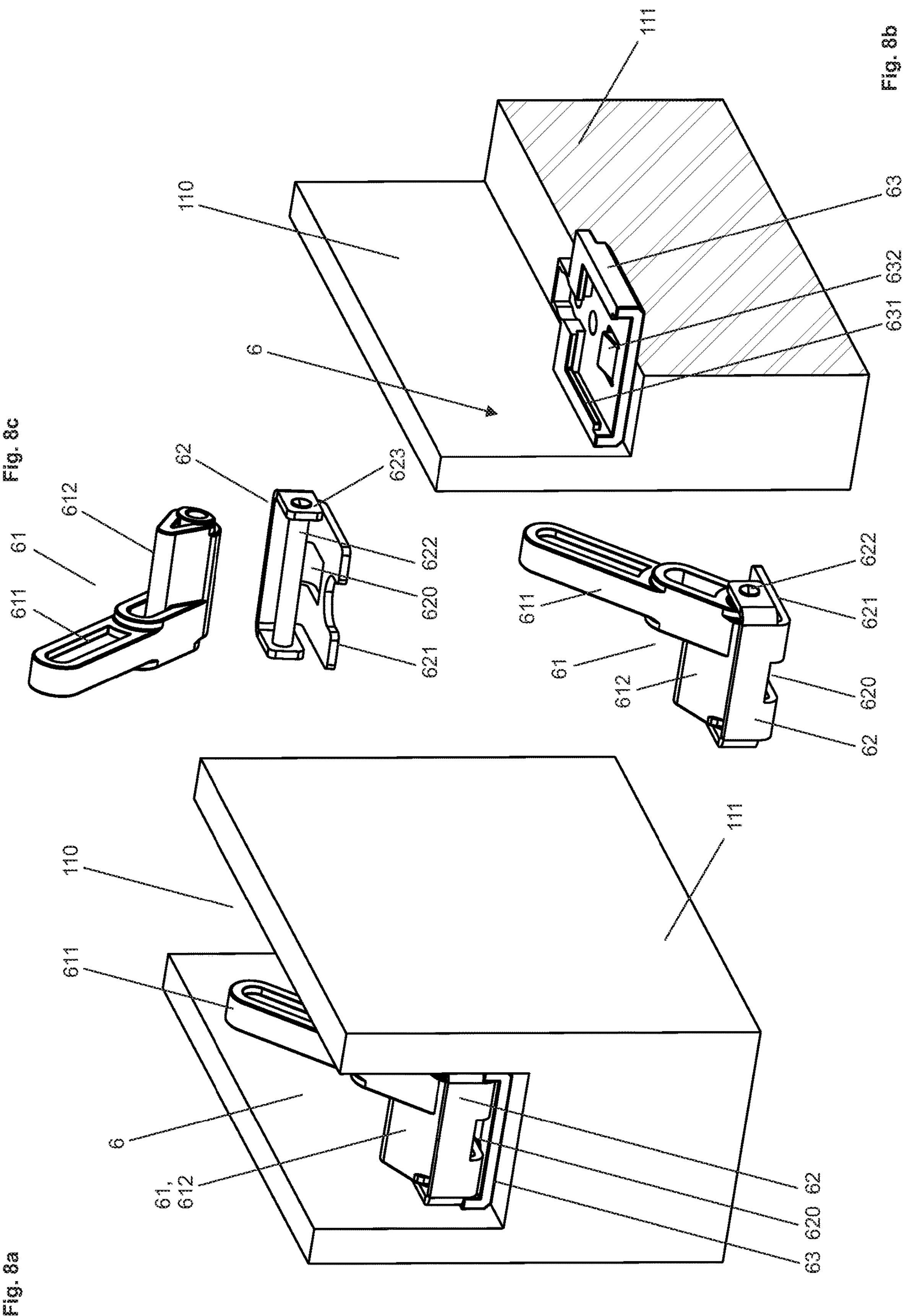
Figure 9:
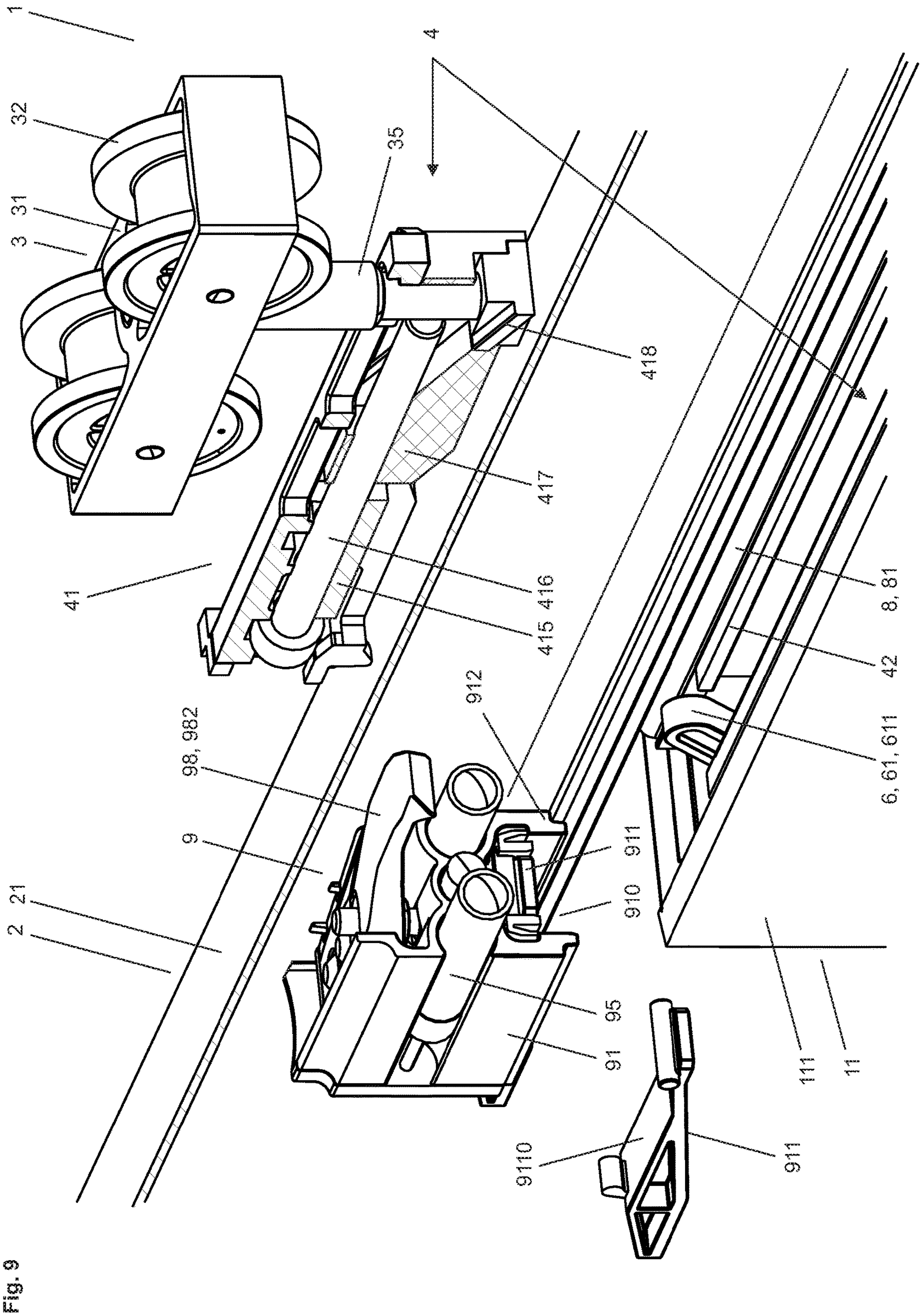

FIG. 6*a* the buffer device 6 of FIG. 1 from the side;

FIG. 6*b* the buffer device 6 of FIG. 6*a* from the front side;

FIG. 6*c* the buffer device 6 of FIG. 6*a* in exploded view;

FIG. 7*a* the mounting device 4 of FIG. 3 with a mounting rail 42 in which a mounting unit 41, which is connected to a carriage 3, is held and which in this preferred embodiment is connected to a mounting bar 43;

FIG. 7*b* the mounting device 4 of FIG. 7*a* in exploded view with a longitudinal section through the mounting unit 41, which is connected to the carriage body 31 of the associated carriage 3 by a connecting screw 35;

FIG. 8*a* the transmission device 6 of FIG. 3 inserted into the door recess 110, comprising a lever holder 62 holding the lever shaft 622 and the transmission lever 61 and being releasably connected to a mounting base 63 connected to the door leaf 111;

FIG. 8*b* the transmission device 6 of FIG. 8*a* with the lever holder 62 detached from the mounting base 63 and the door leaf 111 shown in longitudinal section;

FIG. 8*c* the transmission lever 61 and the lever holder 62 of FIG. 8*b* detached from each other; and FIG. 9 the sliding door system 1 of FIG. 1 in a further preferred embodiment with a preferably designed buffer device 9 and a preferably designed mounting device 4.

DETAILED DESCRIPTION OF EMBODIMENTS

FIG. 1 shows an inventive sliding door system 1 with an inventive sliding door 11, by means of which a simple door opening 10 or a door opening 10 enclosed by a door frame 12 can be closed. The sliding door 11 comprises a door leaf 111, the front quarter of which has been cut away in order to partially expose activatable sealing devices 8 arranged in a door recess 110 on the upper side and preferably also on the lower side. A first mounting device 4 is also shown on the upper side of the sliding door 11, which is connected on the one hand to the door leaf 111 and on the other hand to a first carriage 3. A second mounting device 4, which is connected on the one hand to the door leaf 111 and on the other hand to a second carriage 3, is covered by the rear side of the door leaf 111.

The two carriages 3 are guided in a running rail 2 and can be moved along it until the first carriage 3 hits an inventive buffer device 9, which is mounted in the running rail 2. The left part of the running rail 2 is cut along the longitudinal axis to show the buffer device 9.

By means of the buffer device 9, the sliding door 11 is elastically stopped in an end position or closing position in front of the door opening 10 and preferably fixed by a locking element 98 (see FIG. 3), so that it is held in a defined position, namely the closing position, and cannot move back automatically. The sliding door 11 can only be released from the locking element 98 and moved back again by applying force.

By means of an activation member 911 (see FIG. 3), which is connected to the buffer device 9, the activatable sealing device 8 is also actuated, by means of which an air gap between the upper edge of the sliding door 11 and for example the lower edge of the running rail 2 can be sealed.

The activatable sealing device 8, which is optionally provided on the underside of the sliding door 11, can also be actuated when the closing position is reached, as is known from the prior art described at the beginning.

On the vertical frame bars 121, 122 of the door frame 12, conventional seals 18 are preferably provided to seal the air gap between the sliding door 11 and the vertical frame bars 121, 122 when the sliding door 11 reaches the closing position.

In the closing position of the sliding door 11, the door opening 10 is therefore completely closed and sealed in this preferred embodiment.

Figure 2B:
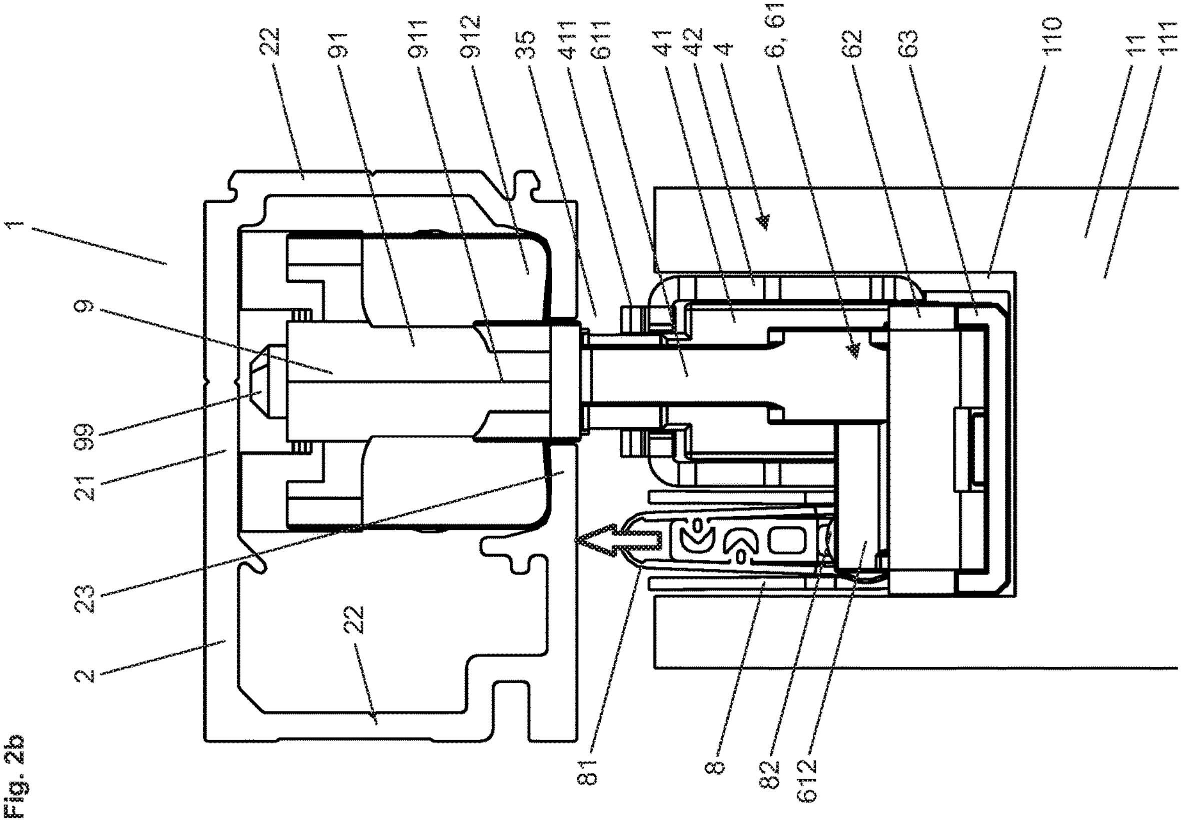
FIG. 2*b* the front side of the sliding door 11 of FIG. 2*a* with a view of the rear side of the mounted buffer device 9, which is tensioned within the cross-section of the running rail 2 by means of at least one counter screw 99.
Figure 2A:
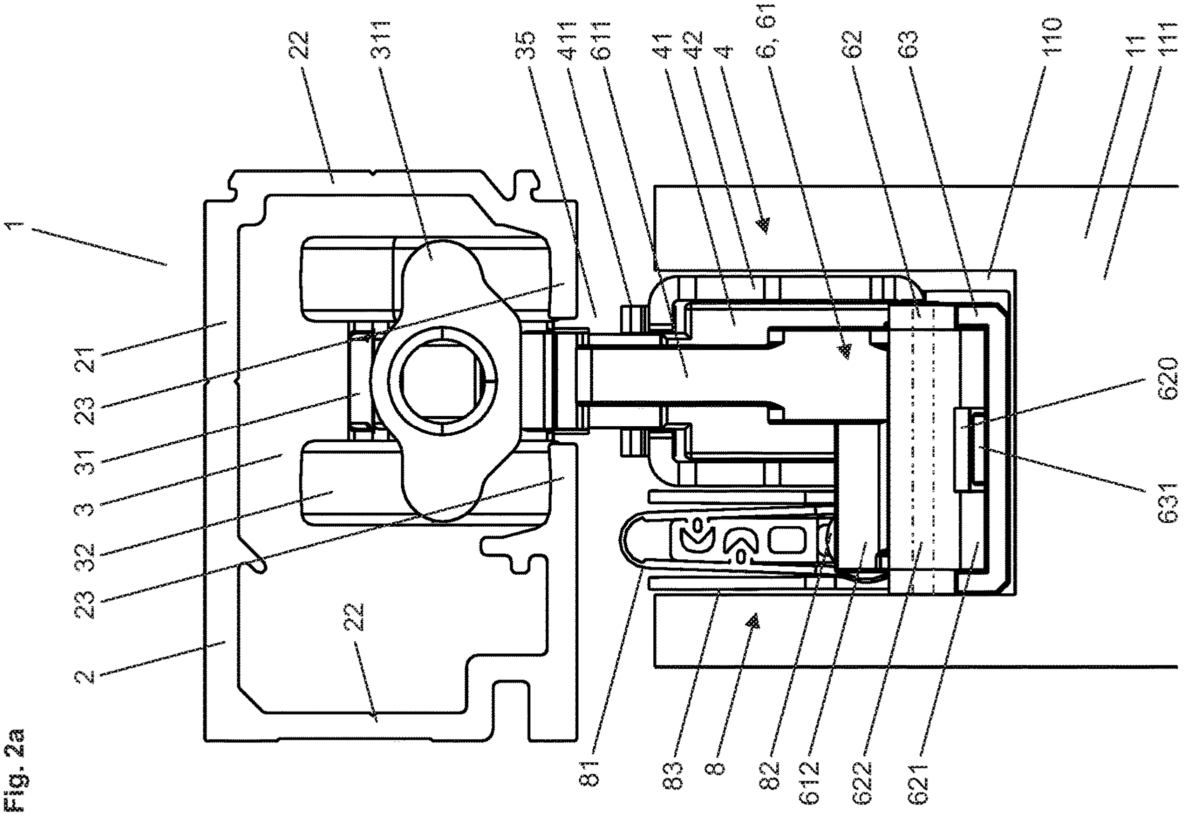
FIG. 2*a* the front side of the sliding door 11 of FIG. 1 facing the buffer device 9 with a door recess 110 on the upper side, in which the transmission device 6 provided for actuating the activatable sealing device 8 is arranged on the front side, and behind it, side by side, the activatable sealing device 8 and a mounting device 4, which is connected to one of the carriages 3 of FIG. 1 by means of a connecting member 35.

FIG. 2*a* shows the front side of the sliding door 11 of FIG. 1 facing the buffer device 9 with the door recess 110 on the upper side of the door leafs 111, in which the transmission device 6 provided for actuating the activatable sealing device 8 is arranged on the front side, and behind it, side by side, the activatable sealing device 8 and the first mounting device 4, which is connected to the first carriage 3 of FIG. 1 by a connecting part 35, for example a connecting screw. The buffer device 9 has been removed from the running rail 2 to reveal the first carriage 3.

The running rail 2 comprises two side pieces 22 which are connected to each other at the top by a head piece 21 and which are connected at the bottom by foot pieces 23 which face each other.

The carriages 3 comprise a carriage body 31, which holds running elements 32 on both sides, which are supported on the foot pieces 23 of the running rail 2. Facing the buffer device 9, the carriage body 31 further comprises a stop element 311 which abuts against the damping element or elements of the buffer device 9 when the closing position of the sliding door 11 is reached.

The transmission device 6 is mounted directly adjacent to the front side of the door leaf 111 and comprises a transmission element in the embodiment of a transmission lever 61, a lever holder 62 and amounting base 63. The lever holder 62 comprises a retaining plate 621, which is detachably anchored in the mounting base 63, and a lever shaft 622, by means of which the transmission lever 61 is rotatably supported.

The transmission lever 61 comprises a first lever part 611 that can cooperate with the buffer device 9, and a second lever part 612 that can cooperate with the actuating element 82 of the activatable sealing device 8. Both lever parts 611, 612 are adjacent to each other and are dimensioned in such a way that an interaction with the actuating element 82 and the buffer device 9 occurs as soon as the sliding door 11 moves into the closing position.

The mounting base 63 includes retaining elements and a latching element 631 by means of which the lever holder 62 is releasably retained. The lever holder 62 comprises a locking recess 620 into which the latching element 631 can engage. The locking recess 620 also forms a window through which a tool, for example a screwdriver, can be inserted to push down the latching element 631 and release it from the lever holder 62. The lever holder 62 can therefore be detached from the mounting base 63 with a single movement of the hand.

The activatable sealing device 8 comprises a housing 83 in which the extractable sealing strip 81 and an extraction mechanism 84 (see FIG. 5*a*), which can be actuated by means of the actuating element 82, are arranged.

In addition to the activatable sealing device 8, a mounting device 4 is arranged inside the door recess 110 for each of the carriages 3. The mounting device 4 shown comprises a mounting rail 42 in which a mounting unit 41 can be slid and locked in one or more positions by means of a latching element such as a latching tongue 411.

FIG. 2*b* shows the front side of the sliding door 11 of FIG. 2*a* with a view of the rear side of the mounted buffer device 9, which is tensioned within the cross-section of the running rail 2 by means of at least one counter screw 99. The buffer device 9 comprises a buffer body 91 with foot elements 912 which are supported on the foot pieces 23 of the running rail 2. Inside the buffer body 91 a counter screw 99 is held in a threaded hole. By turning this counter screw 99 against the head piece 21 of the running rail 2, the buffer body 91 is pressed and tensioned against the foot pieces 23 of the running rail. The buffer device 9 can therefore be inserted into the running rail 2, moved to a suitable position and fixed in place by tightening the counter screws 99.

Furthermore, the buffer body 91 comprises an activation member 911 that can interact with the first lever part 611 of the transmission lever 61 when the sliding door 11 or the first carriage 3 moves against the buffer device 9. During this operation, the transmission lever 61 is rotated, the second lever part 612 is guided against the actuating element 82, the extraction mechanism of the sealing device 8 is actuated and the sealing strip 81 is guided against the underside of the running rail 2, thereby sealing the air gap between the upper edge of the door leaf 111 and the lower edge of the running rail 2. At least the uppermost part of the sealing strip 81 is preferably elastic and is thereby pressed flat against the underside of the running rail 2. The movement of the sealing strip 81 during the closing process is symbolised by an arrow.

It can be seen that the activation member 911 is practically completely integrated into the buffer device 9, wherefore it does not take up any additional space. The buffer device 9 according to the invention can therefore be manufactured with the dimensions of conventional buffer devices 9.

FIG. 3 shows the sliding door system 1 with the sliding door 11 of FIG. 1 in spatial representation with the schematically shown door leaf 111, the first carriage 3 guided in the running rail 2 and facing the buffer device 9, the first mounting device 4, the activatable sealing device 8 and the transmission device 6. The running rail 2 has been cut along the longitudinal axis.

In a preferred embodiment, the buffer device 9 is shown in a longitudinal section along the centre axis. The section runs through two threaded bores or screw channels 990, in which the counter screws 99 are rotatably held. The screw channels 990 are open at the bottom so that a tool can be coupled to the counter screws 99 from below in order to rotate them against the head piece 21 of the running rail 2 shown in the sectional view.

On the underside, the buffer body 91 comprises the activation member 911, which is designed as a ramp. The buffer body 91 therefore integrates the activation member 911, which is fully integrated into the buffer body 91 and thus does not take up any additional space. For this purpose, the buffer body 91 preferably comprises an activation channel 910 between the foot elements 912, into which the first lever part 611 of the transmission lever 61 can enter. When the sliding door 11 is moved further towards the buffer device 9, the transmission lever 61 is rotated clockwise, whereby the second lever part 612 is guided towards the actuating element 82 of the activatable sealing device 8. The activation channel 910 thus allows the transmission lever 61 to be at least partially accommodated in the activation channel 910, wherefore the sealing strip 81 can be raised almost to the running rail 2 and only a minimal air gap results between them.

At the front, the buffer device 9 comprises two lateral dampers 95, only one of which is shown, and a central damper 96. The central damper 96 is made of an elastic material such as rubber or plastic. The lateral damper 95 preferably comprises a piston and a cylinder that can be moved against each other.

Furthermore, the buffer device 9 comprises a preferably elastic locking element 98 on the upper side, which is anchored on the rear side in the buffer body 91 and can be rotated elastically against the buffer body 91 by means of a symbolically shown screw. The longitudinally cut locking element 98 also comprises two elastic locking arms 982 (only one shown), which are directed towards the facing first carriage 3. The two elastic locking arms are each designed to elastically engage and hold one of the rollers 32 of the carriage 3.

FIG. 3 further shows the activatable sealing device 8, which is explained in more detail below with reference to FIG. 5*a* and FIG. 5*b*, the mounting device 4, which is explained in more detail below with reference to FIG. 4, FIG. 7*a* and FIG. 7*b*, and the transmission device 6, which is explained in more detail below with reference to FIG. 8*a*, FIG. 8*b* and FIG. 8*c*.

Figure 4:
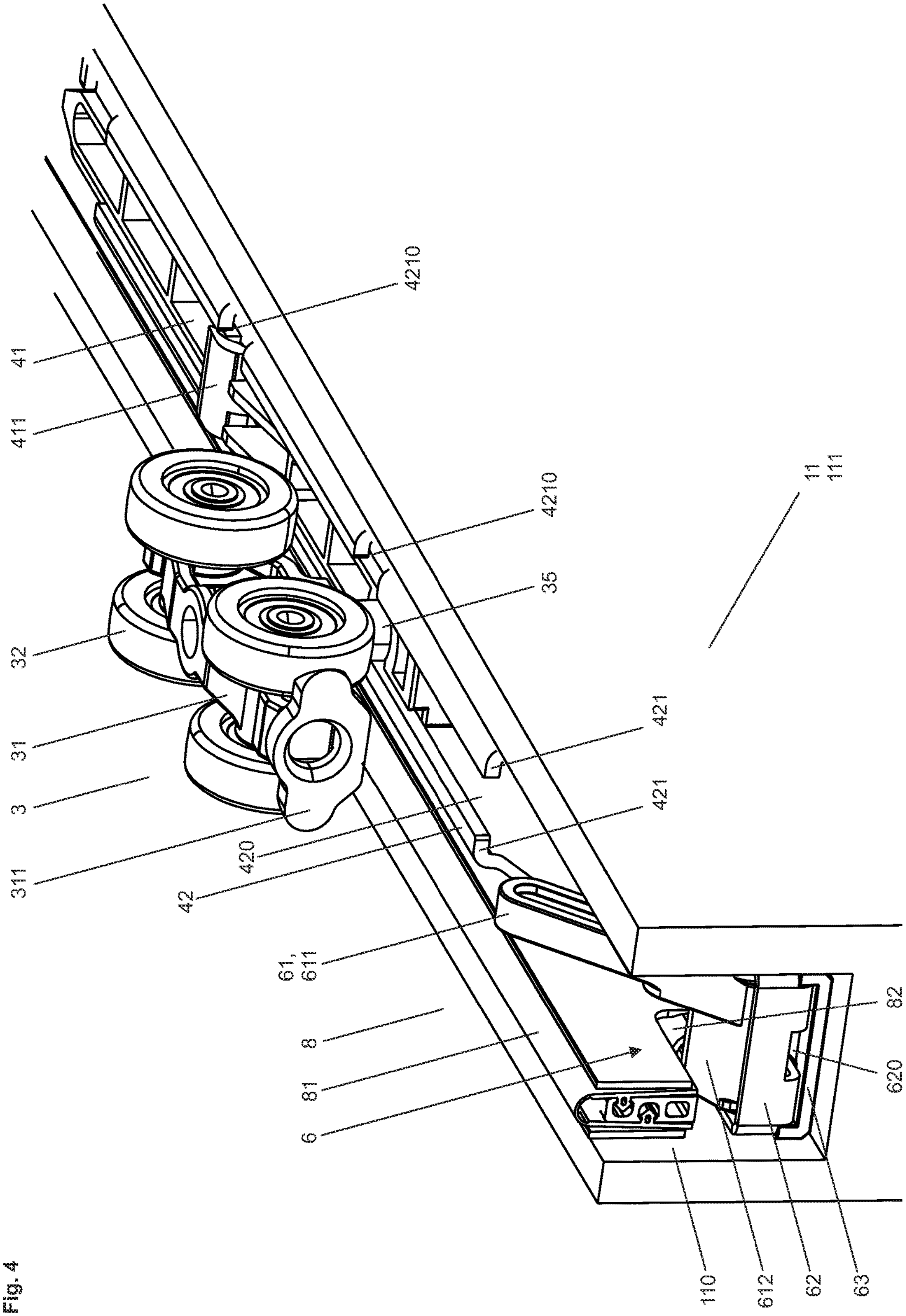
FIG. 4 the sliding door 11 of FIG. 3 with a view of the facing front side of the door leaf 111.

FIG. 4 shows the sliding door 11 of FIG. 3 with a view of the facing front side of the door leaf 111. The mounting device 4 is arranged behind the transmission device 6 in the door recess 110. The mounting rail 42, which is firmly connected, for example screwed, to the door leaf 111, comprises a mounting channel 420 which is delimited by side elements with retaining flanges 421 directed towards each other. The mounting unit 41 is inserted into the mounting channel 420 and is held by the retaining flanges 421. The connecting screw 35 protrudes between the retaining flanges 421 and is screwed into the carriage body 31 of the carriage 3.

The retaining flanges 421 also comprise locking countersinks 4210 in which a latching tongue 411 of the mounting unit 41 is engaged. By lifting the latching tongue 411, the mounting unit 41 can be released and moved inside the mounting rail 42 to another latching position.

With reference to FIG. 2*a*, it has already been described that the lever holder 62 can be loosened and removed practically with a hand movement. If the carriage 3 needs to be serviced or adjusted, the locking connections of the mounting unit 41 and the lever holder 62 are released, after which the mounting unit 41 can be extended with the carriage 3. After maintenance or adjustment of the carriage 3, the mounting unit 41 is pushed back into the mounting rail 42 and locked in place. Then the lever holder 62 is reconnected to the mounting base 63 with a handgrip.

Figure 5A:
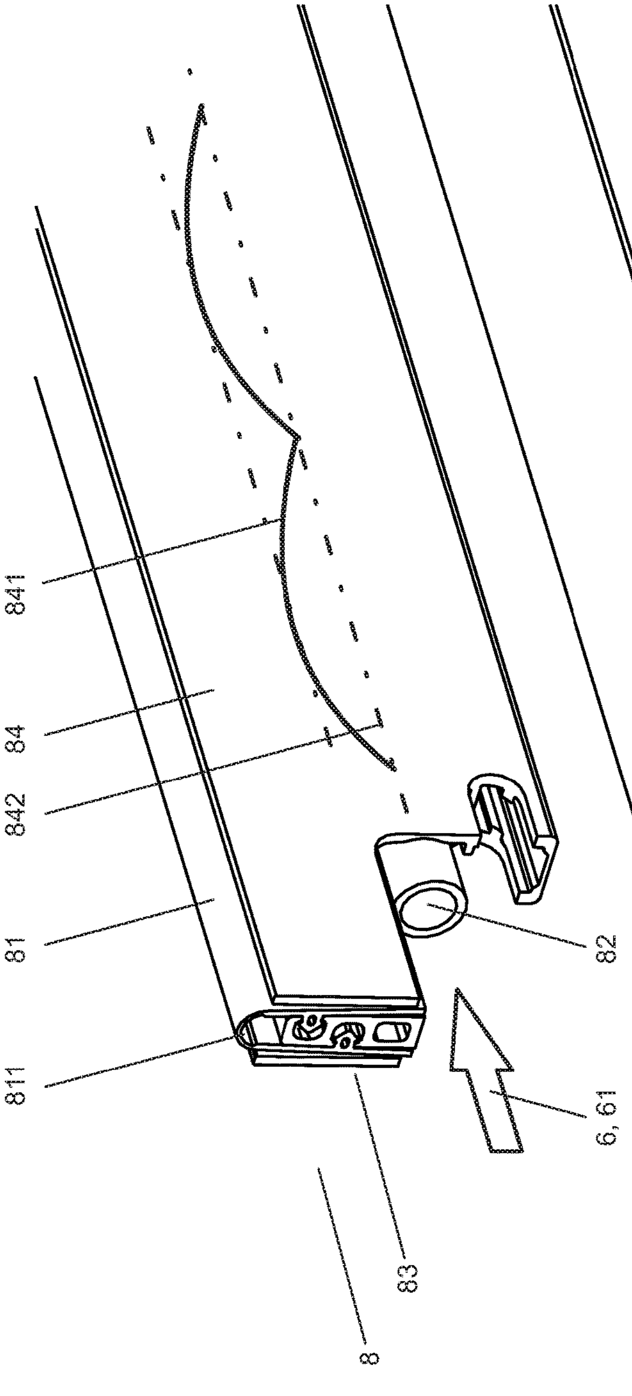
FIG. 5*a* the activatable sealing device 8 of FIG. 4 with a schematically shown extraction mechanism 84 before activation by the symbolically shown transmission lever 61 of the transmission device 6.

FIG. 5*a* shows the activatable sealing device 8 of FIG. 4 with a schematically shown extraction mechanism 84 before activation by the symbolically shown transmission lever 61 of the transmission device 6. In this preferred embodiment, the extraction mechanism 84 comprises several leaf springs 141, which are connected to the actuating element 82 by means of push rods 842. By moving the actuating element 82, the leaf springs 841 are bent in such a way that the scaling strip 81, which preferably comprises an elastic termination element 841, is lifted and elastically pressed against the underside of the running rail 2.

Figure 5B:
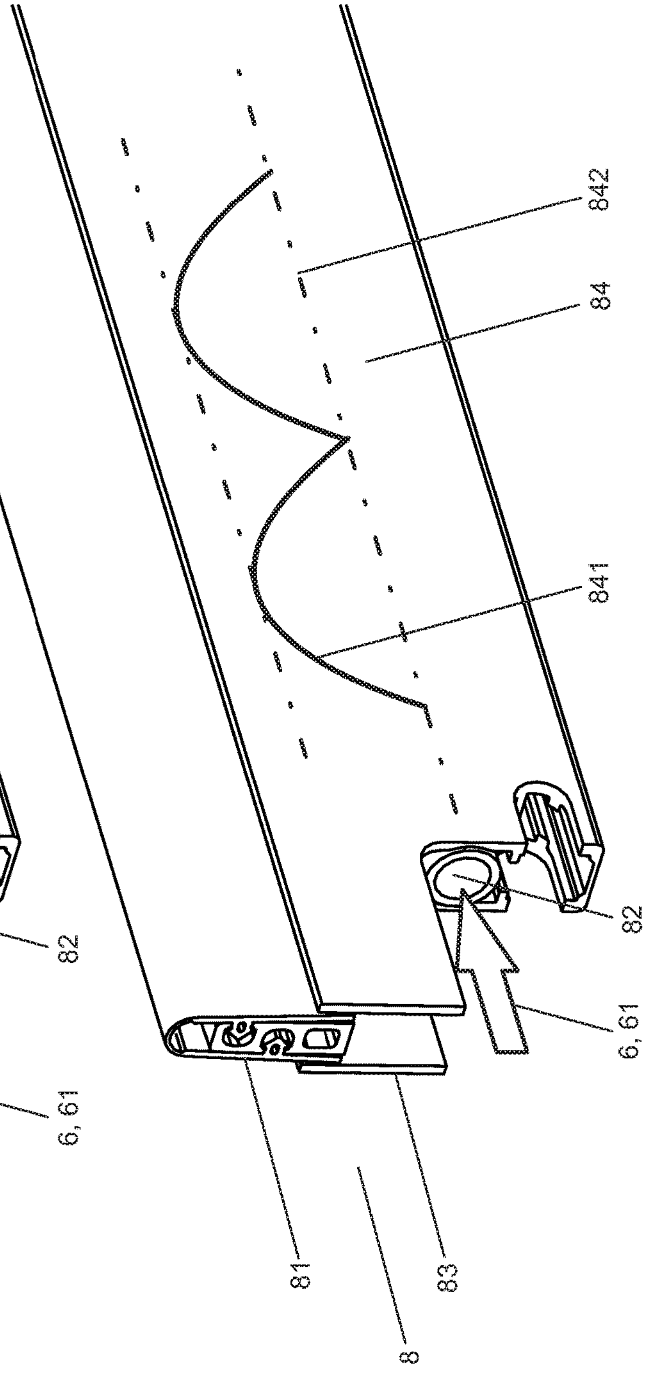
FIG. 5*b* the activatable sealing device 8 of FIG. 5*a* after activation by the symbolically shown transmission lever 61 of the transmission device 6 and actuation of the extraction mechanism 84, by means of which the sealing strip 81 has been raised.

FIG. 5*b* shows the activatable sealing device 8 of FIG. 5*a* after activation by the symbolically shown transmission lever 61, which was guided against the actuating element 82, and the actuation of the extraction mechanism 84, by means of which the sealing strip 81 was lifted.

FIG. 6*a* shows the buffer device 6 of FIG. 1 from the side with the locking element 98, which is anchored in the buffer body 91 on the rear side by an anchor element 981 and which comprises two elastic anchor arms 982 on the front side, which are bent in order to be able to engage over and hold a running wheel 32 each. Since the activation member 911 is integrated and recessed into the buffer body 91, only its lower part is visible.

FIG. 6*b* shows the buffer device 6 of FIG. 6*a* from the front. It can be seen that the two lateral dampers 95 are arranged symmetrically to the central damper 96. On the top side the two locking arms 982 and one of the counter screws 99 are visible. On the bottom side of the buffer device 9 the foot elements 912 of the buffer body 91 are shown, between which the activation channel 910 is sunk into the buffer body 91. The channel bottom of the activation channel 910, forms the preferably ramp-shaped activation member 911. Holes are inserted in the ramp 911, in which a screwdriver can be inserted to turn the counter screw 99 and the anchor element 981, by which the locking element 98 is held and pretensioned.

FIG. 6*c* shows an exploded view of the buffer device 6 of FIG. 6*a*. It is shown that the buffer body 91 comprises two lateral openings 915 for receiving the lateral damper 95, a central opening 916 for receiving the central damper 96 and a retaining lug 918 for retaining the anchor element 981 of the locking part 98. Symbolically, it is shown that the lateral damper 95 preferably comprises a piston 951 which is connected to a piston rod 953 and which is slidably mounted in a damping cylinder 952. In the damping cylinder 952, for example, a viscous substance or a medium, such as air, is provided, which is displaced by the piston 951. Preferably, the piston 951 is returned to its original position by an elastic element. The buffer body 91 is preferably made of plastic or metal.

FIG. 7*a* shows the mounting device 4 of FIG. 3 and FIG. 4 with the mounting rail 42 in which the mounting unit 41, which is connected to the carriage 3, is held and which in this preferred embodiment is supported on a mounting bar 43. In a preferred embodiment, the mounting bar 43 is connectable within the door recess 110 to the door leaf 111 of the sliding door 11 and is preferably made of metal. For easier coupling of the mounting rail 42 to the mounting bar 43, corresponding coupling elements 429, 439 are provided. The coupling elements 429, 439 ensure that corresponding mounting bores and threaded bores of the mounting rail 42 and the mounting bar 43 are always aligned coaxially with each other.

FIG. 7*b* shows the mounting device 4 of FIG. 7*a* in an exploded view and with a longitudinal section through the mounting unit 41. The latching tongue 411, which in FIG. 7*a* is countersunk into a latching depression 4210, is exposed at the end and is preferably elastic. The connecting screw 35, which is connected to the carriage body 31 of the carriage 3, is rotatably held in a connecting channel 410 of the mounting unit 41.

The mounting bar 43, which is separated from the mounting rail 42 in FIG. 7*b*, comprises mounting holes 430 and threaded bores 431. Self-tapping screws 432 can be passed through the mounting holes 430 to connect the mounting bar 43 to the door leaf 111. Subsequently, the mounting rail 42 can be connected to the mounting bar 43 by inserting mounting screws 423 through mounting holes 4230 in the mounting rail 42 into threaded bores 431 of the mounting bar 43. This has the advantage that the mounting bar 43 can be mounted in a simple manner with the required number of self-tapping screws 432 and subsequently only two mounting screws 423, for example, are required for the installation of the mounting rail 42. The mounting rail 42 can therefore be simpler in design and easier to install.

FIG. 7*b* further shows that the mounting rail 42 comprises several locking countersinks 4210 into which the latching tongue 411 of the mounting unit 41 can be countersunk. The mounting unit 41 and/or the mounting rail 42 and/or the mounting bar 43 can be made of any material, such as plastic or metal.

FIG. 8*a* shows the transmission device 6 of FIG. 3 inserted into the door recess 110, which comprises a lever holder 62 holding the lever shaft 622 and the transmission lever 61 and which is detachably connected to a mounting base 63 connected, for example screwed, to the door leaf 111.

FIG. 8*b* shows the transmission device 6 of FIG. 8*a* with the lever holder 62 detached from the mounting base 63 and the door leaf 111 shown in a longitudinal section. The lever holder 62 comprises a retaining plate 621 with a locking recess 620 and bearing flanges 623 (see FIG. 6*c*) which hold the lever shaft 622.

The mounting base 63 comprises a circumferential holding flange 631 under which the retaining plate 621 of the lever holder 62 can be pushed. During this process, the retaining plate 621 is guided over an elastic latching element 632, which is displaced downwards before it can engage in the locking recess of the lever holder 62. By inserting a tool, the latching element 632 can be displaced downwards again to release the lever holder 62 from the mounting base 63.

FIG. 8*c* shows the transmission lever 61 and the lever holder 62 of FIG. 8*b* detached from each other. The two lever parts 611, 612 of the transmission lever 61 have different dimensions but are oriented in the same direction, wherefore the transmission lever 61 takes up only little space.

FIG. 9 shows the sliding door system 1 of FIG. 1 in a further preferred embodiment with a preferably designed buffer device 9 and a preferably designed mounting device 4. The mounting unit 41 of the mounting device 4, which has been removed from the mounting rail 42 and is shown in sectional view, is known from U.S. Pat. No. 9,341,011B2. In this embodiment, the mounting unit 41 comprises an adjustment screw 416 aligned parallel to the longitudinal axis of the running rail and rotatably mounted in a mounting body 415, by means of which a slide holder 417, in which a slide 418 is displaceably mounted along guideways, can be displaced axially. When the slide holder 417 is moved axially, the slide 418, which is connected to the connecting screw 416, is moved up or down along the guideways. By turning the adjustment screw 415 the sliding door 11 can therefore be raised or lowered. For this adjustment it is not necessary to remove the mounting unit 41 from the mounting rail 42, but access to the adjustment screw 416 must be ensured. To do this, the lever holder 62 of the transmission device 6 is detached from the mounting base 63 as described above with reference to FIG. 8*a*, FIG. 8*b* and FIG. 8*c*.

In this embodiment, the carriage 3 comprises only two rollers 32 arranged one behind the other, of which the first roller 32 is held by the single locking arm 982 of the locking part 98 as soon as the carriage body 31 hits the buffer device 9.

The buffer device 9 also comprises a buffer body 91 with an activation channel 910. In this case, the activation member 911 is not moulded onto the buffer body 91 but can be anchored in the activation channel 910 by a mounting part 9110. In this way, the buffer device 9 can be equipped with a suitable activation member 911. The mounting part 9110 is preferably detachable so that it can be detached and reinserted as required. FIG. 9 shows the mounting part 9110 with the activation member 911 after removal and insertion into the buffer device 9.

LIST OF REFERENCES

1 sliding door system
10 door opening
11 sliding door
12 door frame
18 non-activatable door sealing
110 door recess
111 door leaf
2 running rail
21 head piece of the running rail 2
121, 122 frame bars
22 side piece or side pieces of the running rail 2
23 foot piece or foot pieces of the running rail 2
3 carriages
31 carriage body
311 stop element of the carriage body 31
32 running elements, running wheels
4 mounting device
41 mounting unit
410 connecting channel
411 latching tongue
415 mounting body
416 adjustment screw
417 slide holder
418 slide
42 mounting rail
420 mounting channel
421 side elements with retaining flanges
4210 locking countersinks
422 connecting plate
423 correcting screws
43 mounting bar
430, 431 mounting holes, threaded bores
432 self-tapping mounting screws
6 transmission device
61 transmission element, transmission lever
611 first lever part
612 second lever part
62 lever holder
620 locking recess
621 retaining plate
622 lever shaft
63 mounting base
631 holding flange
632 latching element
8 activatable sealing device
81 sealing strip
811 elastic termination element
82 actuating element
83 housing of the sealing device
84 extraction mechanism
841 leaf springs
842 push rods
9 buffer device
91 buffer body
910 activation channel
911 activation member, contact ramp
9110 mounting part
912 foot elements
915 lateral opening
916 central opening
918 retaining lug
95 lateral damper
951 piston with a piston rod 953
952 damping cylinder
953 piston rod
96 central damper
98 locking element
981 anchor element
982 locking arms
99 counter screws
990 screw channels

The invention claimed is:

1. A sliding door system with a sliding door;
which is displaceable along a running rail relative to a stationarily arranged activation member up to a closing position;
which sliding door comprises a door leaf;
which sliding door is equipped with an activatable sealing device which comprises an extractable sealing strip and an actuating element;
which sliding door is equipped with a transmission device comprising a transmission element; and
which sliding door comprises at least two carriages,
which comprise a carriage body and running elements,
which are connected to the door leaf, and
which are held in the running rail displaceable in parallel to the longitudinal axis of the running rail;
wherein the activation member and the transmission device are arranged in such a way that, when the sliding door enters the closing position, a force can be transmitted from the activation member via the transmission element to the actuating element in order to drive out the sealing strip, wherein
a stationary buffer device is provided, which is provided for stopping the sliding door in the closing position and which comprises the activation member.

2. The sliding door system according to claim 1, wherein the buffer device comprises a buffer body and that the activation member is connected or connectable to the buffer body or is an integral part of the buffer body.

3. The sliding door system according to claim 2, wherein the buffer body comprises two foot elements and an activation channel which is located between the foot elements and which is adapted to partially receive the transmission element.

4. The sliding door system according to claim 2, wherein the running rail comprises a U-profile or that the running rail comprises a C-profile with two side pieces which are connected to each other at one end by a head piece and which are connected at the other end to foot pieces directed towards each other, on which the running elements of the carriages are supported and on which foot pieces the foot elements of the buffer body are supported.

5. The sliding door system according to claim 1, wherein the activation member is designed as a ramp which runs straight or along a curve inclined to the longitudinal axis of the running rail.

6. The sliding door system according to claim 1, wherein buffer device is arranged in the running rail, and
a) that the buffer device comprises at least one damper; or
b) that the buffer device comprises on both sides a lateral damper aligned parallel to the longitudinal axis of the running rail with a damping cylinder and a damping piston guided therein; or
c) that the buffer device comprises on each side a lateral damper aligned parallel to the longitudinal axis of the running rail with a damping cylinder and a damping piston guided therein, as well as a central damper arranged between the lateral dampers, which is made of an elastic material.

7. The sliding door system according to claim 1, wherein the transmission element is a transmission lever which comprises a first lever part provided for cooperation with the activation member and a second lever part provided for cooperation with the actuating element of the activatable sealing device, wherein the two lever parts are aligned parallel or inclined to each other.

8. The sliding door system according to claim 1, wherein the door leaf comprises a door recess on an upper side, a) in which door recess a mounting device is arranged, which comprises a mounting unit and a mounting rail, which mounting unit is connected to one of the carriages and is detachably held in the mounting rail, which is connected directly or via a mounting bar to the door leaf;

b) in which door recess besides the mounting device the activatable sealing device is arranged; and c) in which door recess in front of the mounting device and the activatable sealing device the transmission device is arranged.

9. The sliding door system according to claim 8, wherein the transmission device comprises a lever holder holding a lever shaft on which the transmission element is rotatably mounted, and which lever holder is detachably held by a mounting base connected to the door leaf.

10. The sliding door system according to claim 9, wherein the lever holder and the mounting base comprise mutually corresponding retaining elements and mutually corresponding latching elements.

11. A sliding door for a sliding door system according to claim 1, wherein the transmission device comprises a lever holder holding a lever shaft on which the transmission element is rotatably mounted, and which lever holder is detachably held by a mounting base connected to the door leaf.

12. The sliding door system according to claim 11, wherein the activation member is formed as a ramp which is straight or inclined along a curve with respect to the longitudinal axis of the running rail.

13. The sliding door system according to claim 1, wherein the buffer device comprises the activation member by means of which the transmission element of the transmission device can be actuated.

14. The sliding door system according to claim 13, wherein the buffer device further comprises a buffer body which comprises the activation member as an integral part.

15. The sliding door system according to claim 14, wherein the buffer body comprises two foot elements and an activation channel which is located between the foot elements and which is provided for partially receiving the transmission element.

* * * * *